No. 756,449. PATENTED APR. 5, 1904.
J. L. WORRELL.
MEAT SLICING MACHINE.
APPLICATION FILED AUG. 21, 1902.
NO MODEL. 3 SHEETS—SHEET 1.
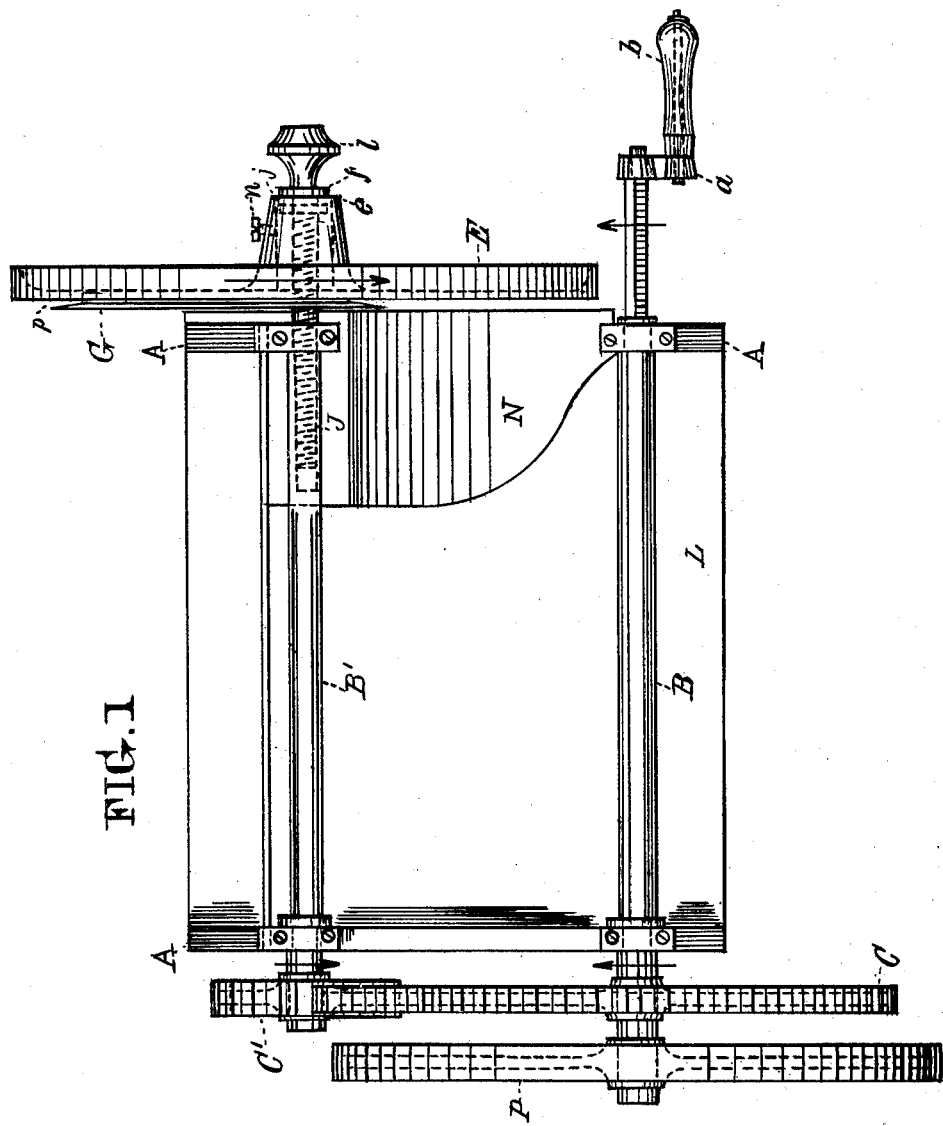
WITNESSES.
E. Moore.
S. E. W. Bewley.
INVENTOR.
J. Leedom Worrell.
by Thomas J. Bewley, atty.

No. 756,449. PATENTED APR. 5, 1904.
J. L. WORRELL.
MEAT SLICING MACHINE.
APPLICATION FILED AUG. 21, 1902.
NO MODEL. 3 SHEETS—SHEET 2.
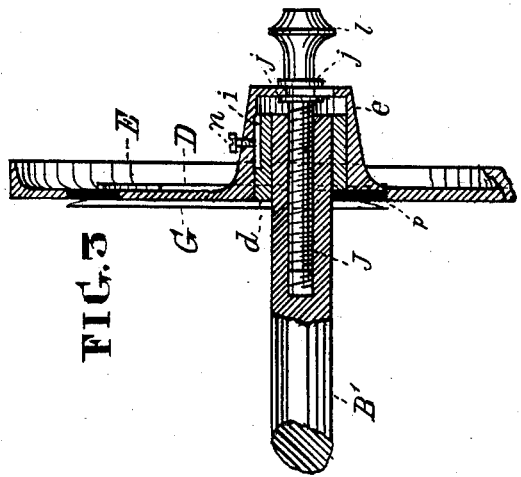
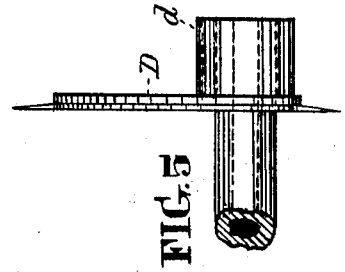
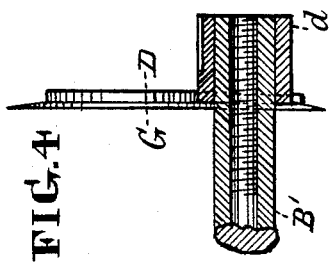
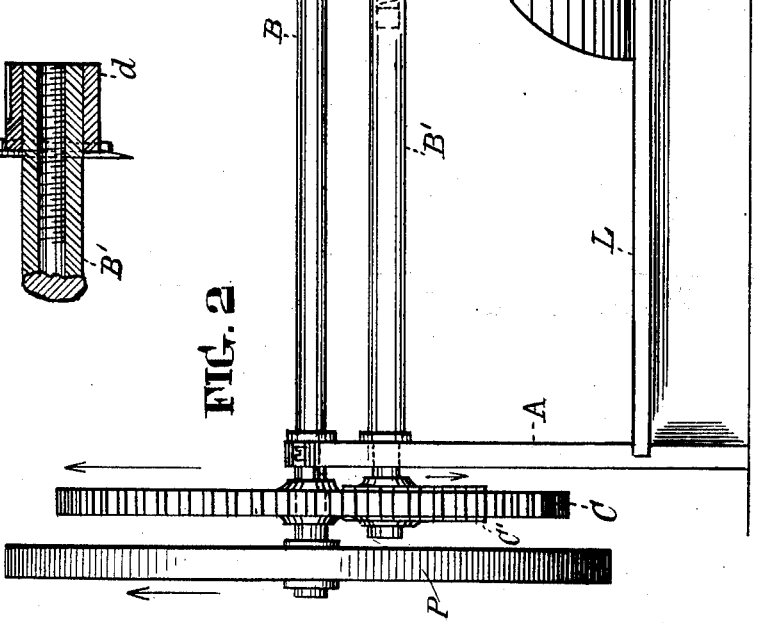
WITNESSES.
E. Moore
T. E. W. Bewley
INVENTOR.
J. Leedom Worrell
by Thomas J. Bewley, atty.

No. 756,449. PATENTED APR. 5, 1904.
J. L. WORRELL.
MEAT SLICING MACHINE.
APPLICATION FILED AUG. 21, 1902.
NO MODEL. 3 SHEETS—SHEET 3.

WITNESSES.
E. Moore
S. E. W. Bewley

INVENTOR.
J. Leedom Worrell
per Thomas J. Bewley, Atty.

THE NORRIS PETERS CO., PHOTO-LITHO., WASHINGTON, D. C.

No. 756,449. Patented April 5, 1904.

UNITED STATES PATENT OFFICE.

JOSEPH LEEDOM WORRELL, OF PHILADELPHIA, PENNSYLVANIA.

MEAT-SLICING MACHINE.

SPECIFICATION forming part of Letters Patent No. 756,449, dated April 5, 1904.

Application filed August 21, 1902. Serial No. 120,577. (No model.)

*To all whom it may concern:*

Be it known that I, JOSEPH LEEDOM WORRELL, a citizen of the United States, residing at No. 1426 North Bourier street, in the city of Philadelphia, county of Philadelphia, and State of Pennsylvania, have invented a new and useful Improvement in Meat-Slicing Machines, of which the following is a specification.

In machines with rotary knives now in use the thickness of the slices of meat to be cut is regulated in the movement of the meat by means of an automatic feed, and until meat becomes very hard and firm the pressure of the knife causes the meat to swell at the center of the face and produces a thick uneven slice or else scrapes portions of meat into the form of crumbs and in practice alternately producing these two defective forms of cuts.

This invention relates to an improvement in a meat-slicing machine; and it consists of a rotating knife rigidly fastened, by means of an arm and hub, upon a shaft and upon which hub is snugly fitted a sliding hub of a disk, which disk may be moved outward or approximately close to the cutting-line of the shearing-knife by means of a collared adjusting-screw threaded into the end of shaft, said adjusting-screw passing through the vertical end wall of the sleeve and having a pair of collars that engage with said wall upon the inner and outer surfaces, whereby the thickness of slices of meat desired to be cut may be regulated at the will of operator.

The invention further consists in such a combination of gearing and arrangement of the shearing-knife in its coacting relation to the adjustable disk as to make the acquired momentum (during the revolutions of the mechanism) available, so that velocity of speed may be maintained by means of a minimum amount of power applied, as will be more fully described in the following specification, reference being made to the accompanying three sheets of drawings, in which—

Figure 8:
Figure 9:
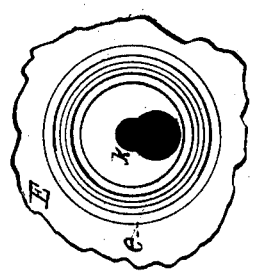
Figure 7:
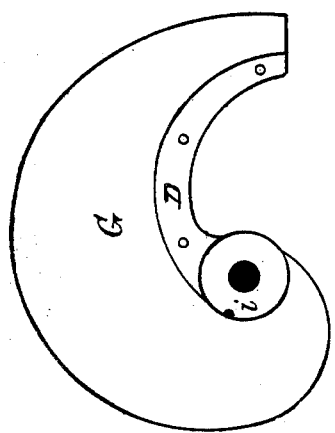
Figure 6:
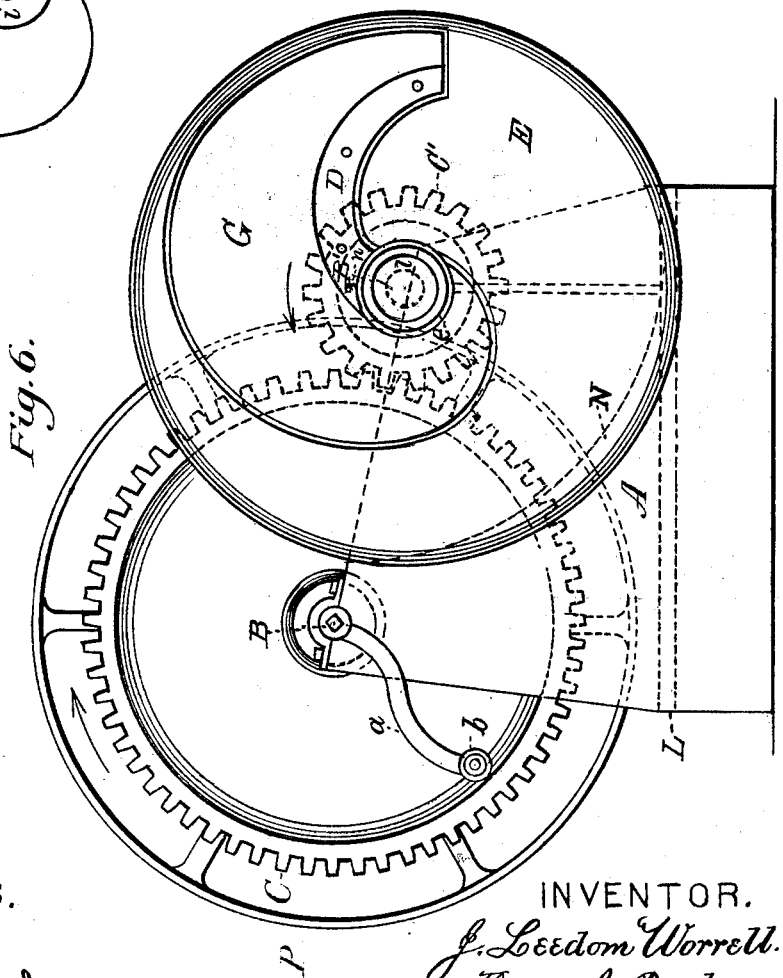

Figure 1 represents a plan view of the improved machine. Fig. 2 is a side elevation of same. Fig. 3 is a sectional view of the end of shaft B', illustrating a similar view of the connection of the sleeve $e$, adjusting-screw J, and disk E upon the end of shaft. Fig. 4 is a longitudinal section of an end of shaft B', showing the connection of the knife G and arm D. Fig. 5 is a view of an end of shaft B' with the hub $d$, knife-arm D, and knife G, with disk E detached from the machine. Fig. 6, Sheet No. 3, is a side elevation of the machine. Fig. 7 is a face view of knife G, hub $d$, and arm D, showing slot $i$. Fig. 8 is a cross-section of a portion of the disk E and sleeve $e$. Fig. 9 is a face view of the end of sleeve $e$ and a portion of the disk E.

A represents the housings or standing frame of the machine, which may be constructed of durable wood or of metal, if desired.

B is the driving-shaft, which in the illustrations is provided with a crank $a$ upon it, having the handle $b$ for communicating rotary motion to the two shafts. This shaft B communicates motion to the shaft B' by means of the cog-wheel C and pinion C', (illustrated in Figs. 1, 2, and 6 of the drawings,) which short train of gearing causes the shafts to be revolved together. Upon the end of the shaft B' is securely fastened the knife-arm D by means of its hub $d$ encircling the end of shaft.

E is the adjustable metallic disk, whose sleeve $e$ is of such internal diameter as to encircle closely the hub $d$ of the knife-arm, so as to prevent any wabbling or vacillating movement upon the hub of said disk in the different adjusted positions it may be placed in laterally.

To enable the sleeve $e$ to slide over and upon the hub $d$ of the knife-arm, yet at the same time to prevent its turning thereon, a keyway $i$ is cut in hub $d$, in which the foot of the set-screw $n$ slides in accommodation to the different adjustments of the sleeve and disk upon said hub to enable the slices of meat to be severed from the mass of desired thickness.

Within an opening in the disk E, although independent of it, is arranged the knife or cutter G. The knife is so constructed and arranged upon the shaft that a short interval of time elapses between the termination of the cutting of one slice and the commencement of the cutting of a succeeding slice, so that the acquired momentum of the knife in the interval aids materially in severing succeeding slices, thus permitting of the use of gearing having greater velocity of action with the same force of power than when two or a series of knives are used upon the same propelling-shaft. This knife is provided with a beveled edge throughout the length of the curved outer side, so that during the slicing operation it is given a shearing action upon the end of the body of material to be cut while lying in the trough N. This trough is represented in Figs. 1, 2, and 6 of the sheets of drawings. This trough is located between the vertical upright framings of the housings A and acts as a guard in guiding the body of matter to the action of the disk and knife and aiding in presenting a fair end surface thereto. It is somewhat curved throughout its length, so that matter to be sliced may rest steadily therein.

J is the adjusting-screw by means of which the disk E is adjusted, and it has its inner end threaded into a corresponding female thread in the contiguous end of the shaft B'. This adjusting-screw extends longitudinally through the end vertical wall of the sleeve $e$ and is provided upon its stem with a pair of collars $j\,j$, which engage, respectively, with the opposing external and internal surfaces of the said vertical end wall of sleeve, as seen in Figs. 1 and 3 of the drawings, said screw passing through the orifice K therein, (shown in detail in Figs. 8 and 9 of the drawings,) whereby in revolving the adjusting-screw J by hand (when desired) by means of the knob $l$, attached to the end of rod, the disk and its sleeve may be drawn on the hub $d$ of knife-arm D, thus bringing the opposing surfaces of disk and knife together, or by a reverse movement of the adjusting-screw the disk may be caused to recede such a distance of separation from the parallel surface of the knife as to form a space (marked $p$) on the drawings of greater or less degree in width between said opposing surfaces of disk and knife, thereby regulating the thickness of cut of slice and providing space for the dropping away of same clear from the action of the knife.

The operation of the machine is as follows: The body of material to be cut lying in position to be cut in the trough N and the disk E being properly adjusted in parallel relation to the surface of the knife G by means of the intermediate adjusting-screw J, allowing such width of space between the opposing surfaces of the disk and knife as it is desired to determine thickness of slice of material and permit of its passage from the machine, power is then applied to the handle on the shaft B, which starts the train of gearing in motion, the wheels moving in the direction marked by the arrow-heads (see Figs. 1 and 6 of the drawings) upon the extremity of shaft B, which communicates motion to the shaft B' through the cog-wheel and pinion C and C', causing motion to the latter-mentioned shaft, carrying the disk E (fly-wheel P) and the knife G, (resting in an opening formed in the disk,) thus slicing the material as it is fed to their united action.

Having thus fully described the construction of the improved machine, what I claim therein as new, and desire to secure by Letters Patent, is—

In a machine for slicing meats, the combination of a shaft, an arm carrying a knife, and secured to the end of the driving-shaft by a hub, said hub having a keyway, a feed-adjusting disk having a sleeve closed at the outer end fitting over said hub, and having a set-screw engaging said keyway, and an adjusting-screw threaded into the end of said shaft, and provided with collars engaging either side of the end wall of said sleeve.

J. LEEDOM WORRELL.

Witnesses:
 THOMAS J. BEWLEY,
 S. E. W. BEWLEY.